US008241415B2

(12) United States Patent
Wantling et al.

(10) Patent No.: US 8,241,415 B2
(45) Date of Patent: Aug. 14, 2012

(54) WAX FORMULATIONS FOR LIGNOCELLULOSIC PRODUCTS, METHODS OF THEIR MANUFACTURE AND PRODUCTS FORMED THEREFROM

(75) Inventors: Steven J. Wantling, Brandon, MS (US); Bonnie Zepka, Louisville, KY (US); Michael A. Greno, High Point, NC (US); Thomas Michael Donlon, Louisville, KY (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 1192 days.

(21) Appl. No.: 11/473,734

(22) Filed: Jun. 23, 2006

(65) Prior Publication Data
US 2007/0181035 A1 Aug. 9, 2007

Related U.S. Application Data

(60) Provisional application No. 60/695,132, filed on Jun. 29, 2005.

(51) Int. Cl.
*C08L 91/06* (2006.01)
*C08L 91/00* (2006.01)
*C08J 3/02* (2006.01)
*C10M 173/02* (2006.01)

(52) U.S. Cl. ... 106/270; 106/271; 106/272; 106/164.11; 508/454; 508/527; 508/528; 516/43; 516/51; 516/924

(58) Field of Classification Search ............... 508/450, 508/454, 527, 528; 106/270, 271, 272, 164.11; 516/43, 51, 924
See application file for complete search history.

(56) References Cited

U.S. PATENT DOCUMENTS

| 3,416,933 A | 12/1968 | Nicholson et al. |
| 4,055,433 A | 10/1977 | Morones |
| 4,497,919 A | 2/1985 | Varga et al. |
| 4,681,910 A | 7/1987 | Crockatt et al. |
| 5,120,355 A | 6/1992 | Imai |
| 5,284,693 A | 2/1994 | Spain et al. |
| 5,346,943 A | 9/1994 | Khungar et al. |
| 5,695,551 A * | 12/1997 | Buckingham et al. ............ 106/2 |
| 5,955,203 A | 9/1999 | Briggs et al. |
| 5,972,094 A | 10/1999 | Bates et al. |
| 6,165,261 A | 12/2000 | Wantling |
| 6,294,608 B1 | 9/2001 | Hager et al. |
| 6,428,902 B1 | 8/2002 | Amundson et al. |
| 6,451,153 B1 | 9/2002 | Symons |
| 6,641,986 B1 | 11/2003 | Zhang et al. |

(Continued)

FOREIGN PATENT DOCUMENTS
EP 0913517 A2 5/1999
(Continued)

OTHER PUBLICATIONS

Galgoci, Ernest C., et al. Innovative Molecular Defoamer Techn, Air Products Products and Chemicals, Inc. Allentown, PA, 2005.
(Continued)

*Primary Examiner* — Cephia D Toomer
*Assistant Examiner* — Vishal Vasisth

(57) ABSTRACT

The present invention is directed to a wax formulation for use in lignocellulosic products, which impart improved properties such as dimensional stability when the products are exposed to moisture. The wax formulations include a wax and a surface tension/interfacial tension reducing agent comprising one or more of a fluorinated compound having two to six carbon atoms, an alkylphenol alkoxylate or an ethoxylated acetylenic diol.

18 Claims, 2 Drawing Sheets

U.S. PATENT DOCUMENTS

| | | | |
|---|---|---|---|
| 6,663,707 B2 | 12/2003 | Wantling et al. | |
| 6,664,327 B2 | 12/2003 | Daisey, Jr. et al. | |
| 6,762,208 B2 | 7/2004 | Schwartz et al. | |
| 7,294,189 B2 | 11/2007 | Wantling | |
| 7,374,610 B2 | 5/2008 | Wantling | |
| 7,473,712 B2 | 1/2009 | Wantling et al. | |
| 7,473,713 B2 | 1/2009 | Wantling et al. | |
| 7,488,383 B2 | 2/2009 | Donlon et al. | |
| 2002/0014611 A1* | 2/2002 | Taylor et al. | 252/8.61 |
| 2003/0084825 A1 | 5/2003 | Wantling et al. | |
| 2004/0013857 A1* | 1/2004 | Winterowd et al. | 428/192 |
| 2004/0053172 A1 | 3/2004 | Zhang et al. | |
| 2004/0063817 A1 | 4/2004 | Ilenda et al. | |
| 2004/0146654 A1 | 7/2004 | Moriarty et al. | |

FOREIGN PATENT DOCUMENTS

| | | |
|---|---|---|
| WO | WO2004/108625 | 12/2004 |
| WO | WO 2005/039841 A2 | 5/2005 |

OTHER PUBLICATIONS

FitzGerald, Paul A., et al. Preparation and dilute solution properties of model gemini nonionic surfactants. Journal of Colloid and Interface Science 275 (2004) 649-658.

* cited by examiner

WAX FORMULATIONS FOR LIGNOCELLULOSIC PRODUCTS, METHODS OF THEIR MANUFACTURE AND PRODUCTS FORMED THEREFROM

RELATED APPLICATION DATA

This application claims the benefit of U.S. Provisional Application Ser. No. 60/695,132 filed Jun. 29, 2005, the entire contents of which are hereby incorporated by reference.

BACKGROUND

The present invention relates to wax formulations, in particular in the form of emulsions, methods of manufacture of such emulsions, use of the wax formulations and emulsions in the manufacture of lignocellulosic products, as well as to methods of manufacture of lignocellulosic products containing the wax formulations.

Lignocellulosic composites include a number of products made by the panel board industry, for example plywood, oriented strand board (OSB, also referred to as flake or wafer board), medium density fiber board (MDF), high density fiberboard, chipboard, laminated veneer lumber, particleboard, and the like. Such composites are formed from wood chips, wood particles and/or fibers, an adhesive binder, and optionally fillers, additives and/or processing aids. In general, the wood is mixed or treated with the binder and the other additive or filler substances, and pressed into the desired shape, i.e., boards, using a specified compacting pressure at a specified temperature range.

In both lignocellulosic composites and lumber (the wood of trees cut and prepared for use as building material) (collectively referred to herein as "lignocellulosic products") it is desirable to control water absorption, which leads to swelling and/or shrinkage. Such dimensional instability has a detrimental affect on the utility of the product. For example, in plywood used for floor underlay, swelling causes buckling or creep in the final wood or tile overlay. Water absorption can also increase the rate of biological degradation of the product.

Waxes have been used to impart water-resistance properties to lignocellulosic products. Waxes are commonly incorporated into composites by addition to the binder, often in the form of an emulsion. Waxes can also be used to impregnate wood, again when in the form of an emulsion. Despite the existence of a number of commercially successful wax formulations, however, there remains a perceived need in the art for wax formulations with improved properties. For example, foaming may occur, or wax solids may not remain homogeneously suspended in mixtures with water-borne resins during use. Separation of the resin and wax results in non-uniformity in the water-repellency and bond quality imparted to the composite by the adhesive binder. Wax formulations usable at lower solids levels would be more economical. There is further a perceived need for improvement in the degree of water repellency imparted to the lignocellulosic product, particularly without also significantly adversely affecting the mechanical or other properties of the lignocellulosic products.

There accordingly remains a need in the art for improved wax formulations for use in lignocellulosic products, particular wax formulations that impart improved properties such as dimensional stability when the products are exposed to moisture.

SUMMARY

In one embodiment, a wax formulation in accordance with the present invention comprises a wax and a surface tension/interfacial tension reducing agent, wherein the surface tension/interfacial tension reducing agent is a fluorinated compound having two to six carbon atoms, an alkylphenol alkoxylate, an ethoxylated acetylenic diol, or a combination comprising one or more of the foregoing surface tension/interfacial tension reducing agents.

A wax emulsion comprises an aqueous medium, an emulsified wax suspended in the aqueous medium, an emulsion stabilizer, and a surface tension/interfacial tension reducing agent as described above.

A method for making a wax emulsion comprises combining an emulsifiable wax, an aqueous medium, and an emulsion stabilizer, and agitating the combination to form a wax-in-water emulsion, wherein a surface tension/interfacial tension reducing agent is added before or after formation of the emulsion.

A lignocellulosic wood product comprises wood and a wax formulation comprising a wax and a surface tension/interfacial tension reducing agent as described above. A method for the manufacture of a wood product comprises impregnating the wood with a wax and a surface tension/interfacial tension reducing agent as described above, preferably in the form of an emulsion in an aqueous medium.

A lignocellulosic composite comprises a lignocellulosic material, a cured adhesive binder, and a wax formulation comprising a wax and a surface tension/interfacial tension reducing agent as described above. A method for the manufacture of a lignocellulosic composite comprises mixing a lignocellulosic material with an adhesive binder, a wax, and a surface tension/interfacial tension reducing agent as described above to form a mixture; and solidifying the mixture in a selected configuration.

Also disclosed are lignocellulosic products made by the above method.

DETAILED DESCRIPTION OF THE INVENTION

Figure 1:
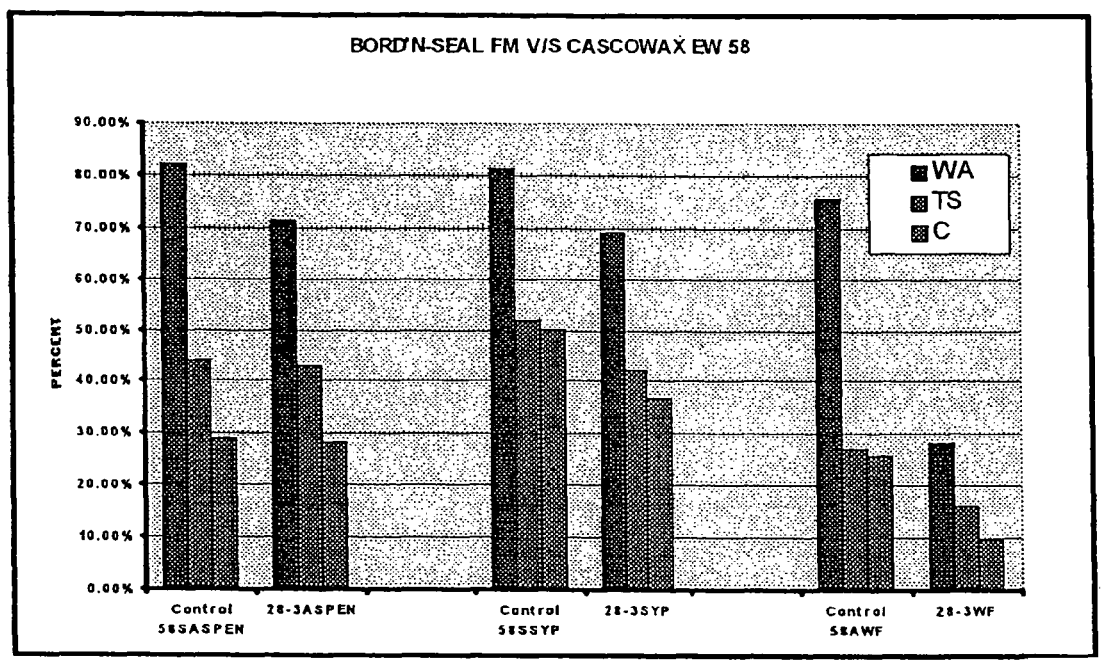
FIG. 1 is a bar graph showing percent water absorbance results for compositions prepared with the disclosed emulsions in relation to a commercially available control.

After extensive investigation, has been found by the inventors hereof that use of specific surface tension/interfacial tension reducing agents, in specific amounts, in wax formulations for the manufacture lignocellulosic products yields improved wax formulations, in particular formulations with low foaming, good fluidity, and improved emulsion. The formulations also impart improved properties to lignocellulosic products, including improved the water resistance, when used at lower solids levels. Improved water resistance can ameliorate the detrimental effects that absorbed water can have on such products, including dimensional instability and/or biological degradation.

The effective surface tension/interfacial tension reducing agents are nonionic, have a hydrophobic segment and a hydrophilic segment, and have been found to fall within three classes, fluorinated $C_2$-$C_6$ compounds, alkoxylates (particularly ethoxylates) of alkylphenols, and alkoxylated (particularly ethoxylated) acetylenic diols. The alkoxylated acetylenic diols may be used in combination with a siloxane. It has further been found that when used in the form of a wax-in-water-emulsion, the surface tension/interfacial tension reducing agents are effective only within a narrow range of 0.0125 to 0.075 percent by weight (wt %) of the total emulsion. Further restrictions on the effective amount depend upon the particular surface tension/interfacial tension reducing agent used as described below.

Suitable fluorinated $C_2$-$C_6$ compounds comprise at least one, preferably at least two, and more preferably at least three fluorine substituents attached to an unsubstituted hydrocarbon moiety. Such compounds have the formula $C_nH_{2n-2-m}F_m$ wherein n is two to six. In one embodiment, n is 3 or 4 and m is at least 3. Such fluorinated $C_2$-$C_6$ compounds can be obtained commercially from Omnova Solutions, Fairlawn, Ohio, for example under the trade name POLYFOX 151N, POLYFOX 136A, and POLYFOX 156A. The fluorinated $C_2$-$C_6$ surface tension/interfacial tension reducing agents are only effective in an amount of 0.0125 to 0.040 wt % of the total emulsion. The amount used is preferably 0.02 to 0.03 wt %, more preferably 0.025 wt % of the total emulsion.

Ethoxylates of alkyl phenols are ethers comprising a polyoxythylene group having about 9 to about 15 ethoxy groups, and an alkylphenol group, wherein the alkyl group has four to about 12 carbon atoms. Suitable ethoxylates of alkylphenols include, for example, octylphenol ethoxylate (also know as octylphenoxypolyethoxyethanol or polyoxyethylene octylphenyl ether, $C_8H_{17}C_6H_4(OCH_2CH2)_nOH$, wherein n is 9-15) and nonylphenol ethoxylate. These compounds are widely commercially available, for example from ICI under the trade names TRITON® X-114, X-102, X-45, X-15. The ethoxylates of alkylphenols may be may be used in amounts of 0.0125 to 0.075 wt % of the total emulsion.

Suitable alkoxylated acetylenic diols are compounds comprising a divalent carbon-carbon triple bond and two or more diols, wherein the substitutions on the acetylenic group are symmetrical or substantially symmetrical. The alkoxy groups are ethoxy or propoxy groups, mixtures of the ethoxy and propoxy groups. Useful alkoxylated acetylenic diols have about 6 to about 100 carbon atoms, for example compounds of the formula (I) or (II):

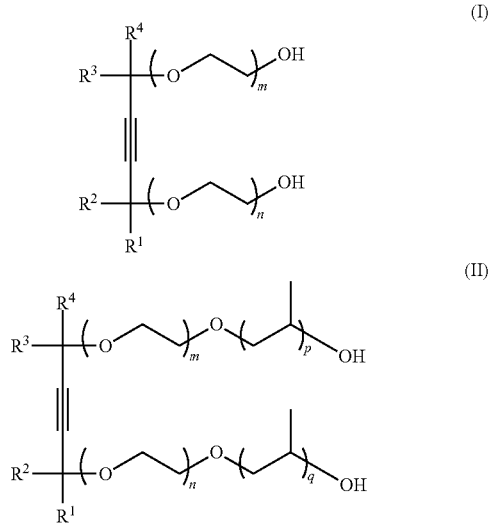

wherein $R^1$ and $R^4$ are a straight or a branched alkyl chain having from 3 to 10 carbon atoms; $R^2$ and $R^3$ are either H or an alkyl chain having from 1 to 5 carbon atoms; and m, n, p, and q are numbers that range from 0 to 20. The acetylenic diol portion of the molecule of formulas I or II can be 2,4,5,9-tetramethyl-5-decyne-4,7-diol or 2,5,8,11-tetramethyl-6-dodecyne-5,8-diol.

In formula I and II, the alkylene oxide moieties represented by $(OC_2H_4)$ are the (n+m) polymerized ethylene oxide (EO) molar units and the moieties represented by $(OC_3H_6)$ are the (p+q) polymerized propylene oxide (PO) molar units. The value of (n+m) may be 0 to 30, preferably 1 to 30, and more preferably from 15 to 20. The value of (p+q) may be 0 to 30. These compounds are commercially available from Air Products and Chemicals, Inc. under the trade names DYNOL and SURFYNOL, for example DYNOL 604, SURFYNOL MD20, and SURFYNOL MD30. These surface tension/interfacial tension reducing agents are only effective in an amount of 0.025 to 0.075 wt % of the total emulsion. They are preferably present in an amount of 0.03 to 0.05 wt %, more preferably 0.005 wt % of the total emulsion.

The alkoxylated acetylenic diols may be used in combination with a siloxane, for example a polyoxyethylene-modified polydimethyl siloxane or other siloxane. Such combinations are commercially available from Air Products and Chemicals Inc. under the trade name SURFYNOL V178. The combination is only effective in an amount of 0.025 to 0.075 wt % of the total emulsion. They are preferably present in an amount of 0.03 to 0.05 wt %, more preferably 0.005 wt % of the total emulsion.

The surface tension modifying compounds may be formulated with a wax. Suitable waxes for improving the water resistance of lignocellulosic materials include, for example natural waxes such as slack wax, whale wax, pappy wax, vegetable wax, paraffin wax, honey wax, and chinese wax, or from synthetic waxes such as esters of fatty acids, for example, n-octadecyl palmitate and cetyl stearate. Slack wax, a solid at ambient temperatures, is a by-product of oil refining processes, is sold as a commodity product, and is a preferred wax for reasons of economy and its high melting temperature. Preferably, the waxes do not contain more than about 5% (by weight) polar compounds as impurities. Suitable waxes include, for example, Ashland-325, Exxon PROMAR 561, and Sun Oil PR-2151.

The wax formulations may include optional additional components to enhance their performance during the manufacture of the lignocellulosic products and the performance of the resulting products, for example, colorants, UV inhibitors, adhesive catalysts, biocides, preservatives, fire retarding chemicals such as borax/boric acid, guanylurea phosphate-boric acid, dicyandiamide phosphoric acid formaldehyde, diethyl-N,N-bis(2-hydroxyethyl)-aminomethyl phosphate, and the like, and combinations comprising one or more of the foregoing additives.

In another embodiment, the wax formulation may be used in the form of a wax-in-water emulsion wherein wax is the discontinuous phase. Such emulsions are typically formed by, for example, stirring molten wax into water in the presence of an emulsion stabilizer. Suitable emulsion stabilizers include the reaction product of a relatively strong basic component with a relatively weak organic acidic component. The emulsion stabilizer can be prepared prior to emulsion formation or can be made in situ during emulsion formation.

Both organic and inorganic bases can be used in the emulsion stabilizer. Preferred bases for use in preparing the emulsion stabilizer of the invention are ammonia and the amines. Typical organic amines include compounds having from 1 to 5 amino groups and from about 1 to 4 organic groups. The groups can be straight chain or branched chain alkyl, aryl or alkyl substituted aryl groups. Examples of suitable amines include methylamine, ethylamine, aniline, isopropylamine, tertiary butyl amine, diethylamine, dicyclohexylamine, monoethanolamine, diethanolamine, triethanolamine, pyridine, etc. and mixtures thereof. Preferred basic components comprise ammonia, monoethanolamine, diethanolamine, triethanolamine, and mixtures thereof.

The relatively weakly acidic component of the emulsion stabilizer comprises an organic anion-forming compound having one or more anion forming functional groups. The compounds can have a molecular weight of about 150 to 100,000. Examples of useful relatively weakly acidic components include carboxylic acids, substituted succinic acids, modified fatty acids, relatively high molecular weight polymeric compounds having pendant or substituent acidic groups such as polyacrylic acid, polymethacrylic acid, acrylic copolymers, methacrylic copolymers, maleic anhydride polymers and copolymers, and others. Preferred relatively acidic components for use in the emulsion stabilizer of the invention include polyelectrolyte polymers and the $C_{6-18}$ fatty acids including caproic acid, lauric acid, palmitic acid, stearic acid, behenic acid, oleic acid, linoleic acid, linolenic acid, etc. Most preferred weakly acidic components comprise the mono-, di- and tri-unsaturated carboxylic acids having 8 to 24 carbon atoms, including oleic, linoleic and linolenic acid, and mixtures thereof Other additives can be used in the emulsions, including those described above for the wax formulations, as well as chelating agents such as nitriloacetic acid (NTA), N-hydroxyethylaminodiacetic acid, citric acid, tartaric acid, gluconic acid, tripolyphosphate, and other polyphosphate glasses, 2,2'-bipyridine, 8-hydroxyquinoline, N,N'- ethylene-bis 2-(ortho-hydroxyphenyl)glycene, carboxymethlymercapto succinic acid, polyamino carboxylates, ethylenediaminetetraacetic acid and salts thereof, and hydroxyethyl-ethylene diamine triacetic acid, and the like; and colloidal stabilizing agents such as polyvinyl alcohol and hydroxyethyl cellulose.

These emulsions can be made by combining the components in a manner appropriate for the formation of aqueous emulsions. For example, the more hydrophobic components are converted into a finely divided form and combined with water in the presence of the emulsion stabilizer using high mixing rates. In one procedure, the wax in a finely divided or melt form in water is combined directly with the emulsion stabilizing composition which can be added to the mixture, dissolved or suspended in water. Alternatively, the emulsion stabilizer can be formed in situ in the mixture by then adding the other components to the mixture. If the components are combined in melt form at temperatures of about 100° F. (about 70° C.) or greater, the emulsion stabilizing components can be added directly to the melt, commonly in the substantial absence of water. Either the basic or the acidic component can be added directly to the melt or the acidic and basic components can be added together.

The melt is then added to water at a temperature of 200° F. (95° C.) or less, e.g., 160-200° F. Before combining, the temperature of the water is preferably adjusted to a temperature near the temperature of the melt in order to promote rapid mixing and emulsion formation. At this time any additional components such as an antifoam agent, a protective colloid, a dye, a preservative, and the like can be added. The fully formed emulsion composition commonly has a low Brookfield viscosity of about 50-1000 cP using a number 1 spindle at 20 rpm measured at ambient or room temperature, about 65 to about 80° F. (about 20 to about 25° C.). The emulsion commonly has about 0.1 to 10% solids, and a pH of greater than about 8.

The relative amount of each component in the emulsion can vary (except for the surface tension/interfacial tension reducing agent) depending on the wax and emulsion stabilizer used. In general such emulsions can comprise, for example, about 25 to about 80 wt % water, about 20 to about 60 wt % of a wax, about to about 0.1 to 5 wt % of a emulsion stabilizer, and typical amounts of antifoam agents, preservatives, dyes and other components, as well 0.025 (±50%) wt % of a surface tension/interfacial tension reducing agent as described above. Such emulsions can also comprise about 35 to about 75 wt % water, about 30 to about 50 wt % of a wax compound, about 1 to about 5 wt % of an emulsion stabilizer, and about 0.02 to about 0.30 wt. % of a fluorosurfactant. More specifically, the emulsion comprises about 50 to about 60 wt % water, about 38 to about 47 wt % of a slack wax, about 1 to about 2 wt % of a weak acid such as stearic acid, about 0.5 to about 1.5 wt % of an amine base such as triethanoloamine, and 0.025 wt % of a fluorocarbon surface tension/interfacial tension reducing agent (preferably a $C_3$ or $C_4$ fluorocarbon) or 0.05 wt. % of an alkoxylated acetylenic diol or 0.05 wt. % of a combination of an alkoxylated acetylenic diol and siloxane.

In another embodiment, the wax emulsions may be formed from a combination of a nonsaponifiable wax and a saponifiable wax, a saponifier, and optional dispersant/surfactant and other additives.

Useful nonsaponifiable waxes are of low volatility, exhibiting less than about a 10% loss in weight during standard thermogravimetric analysis, and have an oil content of less than about 5% by weight, preferably less than about 1% by weight. The waxes may be of a relatively high molecular weight, having an average chain length of 36 carbons or greater. Suitable waxes may also have a melting point greater than about 120° F. (about 49° C.), e.g., about 120 to about 165° F. (about 49 to about 74° C.), specifically about 120 to about 150° F. (about 49 to about 66° C.), and more specifically about 135° F. to about 145° F. (about 57 to about 63° C.). Specific examples of such waxes include paraffin waxes, slack waxes and scale waxes. Paraffin waxes are typically derived from light lubricating oil distillates and are predominantly straight chain hydrocarbons having an average chain length of 20 to 30 carbon atoms. Suitable paraffin waxes include Wax 3816 available from Honeywell/Astor of Duluth, Ga. Slack waxes are petroleum waxes having an oil content of 3 to 50 wt %. Suitable slack waxes include Exxon 600 Slack Wax and Ashland 200 Slack Wax, and a combination of Exxon 600 Slack Wax and Ashland 200 Slack Wax.

Suitable saponifiable waxes have an acid value or a saponification value and a melting point greater than about 180° F. (about 82° C.). Saponifiable waxes include waxes from the liquefaction of coal, vegetable waxes, and oxidized waxes resulting from the processing and/or refining of slack wax, scale wax or crude petroleum, for example montan wax, carnauba wax, beeswax, bayberry-myrtle wax, candelilla wax, caranday wax, castor bean wax, esparto grass wax, Japan wax, ouricury wax, retamo-ceri mimbi wax, shellac, spermaceti wax, sugar cane wax, wool-lanolin wax, and others. A specific saponifiable wax is a montan wax having a melting point of about 190 to about 200° F. (about 88 to about 93° C.).

Saponification of such waxes occurs by combining the wax with a saponifier, i.e., a strongly basic material such as ammonium hydroxide or an alkali metal hydroxide such as sodium hydroxide or potassium hydroxide. The alkali metal hydroxide may be provided in the form of a concentrated aqueous solution, for example a solution that comprises about 45 wt % alkali metal hydroxide. Ammonium hydroxide may be provided in solid form. Some or all of the saponifier may also react with other components of the emulsion in situ. Ammonium hydroxide may be advantageous when the emulsion is used with lignocellulosic materials from northern wood species, i.e., Douglas fir, aspen and the like.

The wax component may be present in an amount of about 25 percent by weight (wt %) to about 50 wt %, based on the total weight of the emulsion, preferably about 30 wt % to about 40 wt %. Preferably, the wax component comprises a combination of a nonsaponifiable wax having a melting point of greater than or equal to about 120° F. and a saponifiable wax. The nonsaponifiable wax may comprise about 25 wt % to about 44 wt % of the total weight of the preservative composition, and the saponifiable wax may comprise about 0.5 wt % to about 5 wt % of the total weight of the emulsion. In one embodiment, the wax component comprises paraffin wax in an amount of about 25 wt % to about 45 wt %, preferably about 30 wt % to about 40 wt %, and saponifiable wax in an amount of about 2.5 wt % to about 5 wt %, preferably about 3.5 wt % to about 4.5 wt %, based on the total weight of the emulsion.

The amount of saponifier to saponify the wax may be calculated based on the saponification value of the wax as is known in the art. The amount of saponifier may also be varied based on type of saponifiable wax used, or the type of wood. For example, the saponifier may be provided in an amount of about 0.15 to about 4.5 wt %, optionally about 0.5 to about 3 wt % of the emulsion. Concentrated aqueous saponifier may be provided in an amount of about 0.5 to about 3 wt % of the emulsion; ammonium hydroxide may be added in solid form in an amount of about 0.15 to about 3 wt % of the emulsion. As a result of the saponifier, an emulsion has a pH of about 8.5 to about 12.5, for example, a pH of about 8.5 to about 9.5.

Other additives may be used in the wax formulations, for example dispersant/surfactants, carboxymethylcellulose, alkyl phenols, and the like.

Exemplary carboxymethylcellulose materials have carbon chain lengths of about 20 to about 50 carbon atoms. An example of a suitable carboxymethylcellulose is carboxymethylcellulose sodium, available from Penn Carbose, Somerset, Pa., under the trade designation LT-30, which is described as having carbon chain lengths of about 26 to 30 carbons. Other suitable carboxymethylcellulose materials include Penn Carbose LT-20 and LT-42. The carboxymethylcellulose and the product of its reaction with the saponifier or with any other component in the emulsion are referred to herein as the "carboxymethylcellulose component".

A salt of polynaphthalenesulfonic acid is useful in the emulsions described herein and, without wishing to be bound by theory, is believed to act as a dispersant/surfactant. The salt may be the product of an in-situ reaction of polynaphthalenesulfonic acid and a saponifier, e.g., an alkali metal hydroxide. One commercially available polynaphthalenesulfonic acid is DISAL GPS, which may be obtained from Handy Chemical, Montreal, Quebec, Canada. The acid and acid salt are referred to collectively as a polynaphthalenesulfonic acid component or, more broadly (to include substitute materials), as the dispersant/surfactant. The dispersant/surfactant may comprise about 0.1 to about 5 wt % of the emulsion, optionally about 0.25 to about 5 wt %.

Incorporating an alkyl phenol into the emulsions has been found to facilitate achieving low water absorption in the final lignocellulosic composite product. As used herein, "alkyl phenol" refers to a phenolic compound having a straight or branched $C_{20}$-$C_{42}$, specifically $C_{24}$-$C_{34}$, more specifically $C_{24}$-$C_{28}$ alkyl group. More than one alkyl group can be present, but usually no more than 2 or 3 are present for each aromatic nucleus in the aromatic group. Most typically only one hydrocarbyl group is present per aromatic moiety, particularly where the hydrocarbyl-substituted phenol is based on a single benzene ring. Such alkyl phenols include polymerized methylene-coupled alkyl phenol, phenate salts, calcium phenates, long branched chain calcium alkyl phenols, long straight chain calcium alkyl phenols and complex polymers of maleic acid with and without an amine group substitution. The long chain alkyl group may be a polymeric group such as a polyethylene, polypropylene, or polybutylene group, for example. The alkyl substituents may be a mixture of different chain lengths as is often the case with commercially available materials. One example of an alkyl phenol component useful in the compositions of the present invention is commercially available under the trade designation 319H from Lubrizol Chem. Corp. Wycliffe, Ohio, which material is described as a $C_{24}$-$C_{34}$ polymerized methylene-coupled alkyl phenol.

Preferably, the alkyl phenol is chosen so that the average carbon chain length of the alkyl portion matches, i.e., is approximately the same as or is close to, the average carbon chain length of the carboxymethylcellulose. For example, an alkyl phenol of average chain length in the range of about $C_{24}$ to about $C_{34}$ may be used in an emulsion comprising carboxymethylcellulose having an average chain length of about 26 to about 32 carbons, e.g., Carbose LT-30 carboxymethylcellulose.

The alkyl phenol and product of the reaction of an alkyl phenol with a saponifier or with any other component of the emulsion is referred to herein as the alkyl phenol component. The amount of alkyl phenol component is typically about 0.25 to about 10 wt %, specifically about 0.5 to about 2.5 wt %, based on the total weight of the emulsion.

When used, the emulsions may be prepared using methods known in the art. For example, in one method of proceeding, the nonsaponifiable wax is melted and agitated, and the molten saponifiable wax is added thereto with continued agitation. The molten wax and water (heated to a temperature that will not solidify the wax) is then combined, with continued agitation, followed by a dispersant/surfactant and saponifier. Additional water is charged, and the mixture is heated for a period of time. The mixture is then homogenized (e.g., at about 1500 to about 3500 pounds per square inch (PSI) (about 10 megaPascals (MPa) to about 24 MPa), and cooled, optionally in process that provides two exotherms, including a first exotherm between the exit temperature from the homogenizer to a temperature above ambient, and a second exotherm to ambient (storage) temperature. For example, the emulsion composition is passed from the homogenizer to a cooler to achieve a first exotherm of, e.g., about 10° F. to about 20° F. degrees lower than the homogenizer exit temperature, and then to a cooling tank to achieve a second exotherm of, e.g. about an additional 5° F. to about 15° F. lower, optionally under agitation. In one embodiment, the first exotherm may occur by cooling from about 130° F. to about 110° F., and the second exotherm may occur by cooling from about 110° F. to about 70° F.

In an alternative method of preparing the emulsion, a batch process may be used in which a first premix comprising the molten waxes and alkylphenol may be prepared, and a second premix (an aqueous premix) comprising the water, carboxymethylcellulose and polynaphthalenesulfonic acid and saponifier may be prepared, and the first and second premixes may then be combined in a mixing tank for a time sufficient at least for the waxes to become saponified, e.g., for one to three hours, and the resulting mix may then be passed to a homogenizer and cooled as described above.

Suitable emulsions have a viscosity of about 10 to about 100 centipoise, measured on a Brookfield viscometer. The stability, shear performance and lack of foam generation further enhance the utility of these emulsions.

In one embodiment, the wax formulations, optionally in the form of an emulsion, are used with an adhesive binder in the manufacture of lignocellulosic composites. A wide variety of adhesive binders may be used, including isocyanate resins, for example MDI resins, phenol-formaldehyde-urea resins, phenol-formaldehyde-melamine resins, melamine-urea-phenol-formaldehyde resins, and the urea-formaldehyde (UF) and phenol-formaldehyde (PF) resin systems commonly used in the manufacture of many lignocellulosic composites, and mixtures thereof. The phenol-based resins may be liquid at room temperature or they may be solid, such as spray-dried resin powders. Furthermore, the phenol-based resins may be either novolac, resole, or combinations of these two general types of phenolic resins. Resoles in particular are commonly used as the binding resin for lignocellulosic composite products. The wax formulation may be combined with the curable resin binder formulation to provide a one-part system, or the wax formulation and binder formulation may be combined immediately prior to use.

The resins may be prepared by any suitable method to provide an adhesive resin having a final pH of between about 9 and 12 and a sufficiently high formaldehyde mole ratio to make the resin thermosetting. For example, a phenolic resole resin is prepared to provide a formaldehyde to phenol mole ratio of about 1:1 to 3:1, preferably, about 1.8:1 to 2.7:1. The present invention is not limited to any particular process of preparing the resin and methods are well known to those skilled in the art.

Skilled practitioners recognize that the reactants used to prepare the resin are commercially available in many forms. Any form which can react with the other reactants and which does not introduce extraneous moieties deleterious to the desired reaction and reaction product can also be used in the preparation of the resins used in the adhesives of the present invention. Formaldehyde, for instance, is available in many forms. Paraform (solid, polymerized formaldehyde) and formalin solutions (aqueous solutions of formaldehyde, sometimes with methanol, in 37 percent, 44 percent, or 50 percent formaldehyde concentrations) are common. Instead of formaldehyde, other aldehydes may be used such as acetaldehyde, and propionaldehyde. Typically, formalin solutions are preferred as the aldehyde source.

The phenol component of the resin includes any phenol typically used in preparing phenolic resole resins. Typically, ordinary phenol is used, but the phenol may be partly or completely substituted with xylenols, cresols, catechol, resorcinol, alkyl resorcinols, other naturally occurring or synthetic phenols or alkyl phenols such as cresylic acids, urea, melamine, or combinations thereof.

Urea is available in many forms. Solid urea, such as prill, and urea solutions, typically aqueous solutions, are common. Urea is also available in combination with formaldehyde as a UF concentrate. Melamine is also commercially available and the melamine may be totally or partially replaced with other aminotriazine compounds. Other suitable aminotriazine compounds include substituted melamines, or cycloaliphatic guanamines, or mixtures thereof.

Any suitable catalyst may be used to form the thermosetting resin. Phenolic resins, for instance, typically use alkali metal hydroxides, alkaline earth hydroxides, ammonium hydroxide, metal carbonates, and amines.

To form lignocellulosic composites, the binder and wax formulation are combined with lignocellulosic materials such as wood fibers, wood flakes, wood strands, wood chips and wood particles, optionally together with materials such as with pulp wood or wastes, wood bark, saw dust and paper, chips and/or cellulose-containing fibers of annual plants (rice shells, straw, flax, reeds, bagasse, corn stalks, or the like), granulated biomasses (needles, leaves, stalks, bark and the like) and recycled synthetic and natural rubber, recycled wood fiber, waste fibers and other organic substances, including the grinding dust of the boards produced, and mixtures thereof. The lignocellulosic material may be processed prior to used, for example treated with hydrogen peroxide, esterified by, for example, acetylation, or cross-linked using, for example, an aldehyde. Alternatively, hemicellulose is reacted with lignin under elevated temperatures, typically using steam treatment. An extender, in particular, wood flour, coconut shell flour, walnut shell flour, bark flour and/or starch in an amount of from about 0.1-3% by weight, preferably from about 0.5-2% by weight with respect to the binder resin.

Typically, a sufficient amount of the wax formulation is blended with the resin to impart the desired level of water-resistant properties to the final composite. Generally, the amount of wax formulation solids does not exceed about 10 wt % of the total binder resin used. The preferred amount will depend on the composites intended use and target properties. In most cases, the wax formulation is used in an amount between about 0.1 and about 10 wt % based on solids of the resin/wax emulsion adhesive. For example, in the manufacture of insulation boards, 0.5 to 1% can be used; in hardboard, 0.75 to 1 wt % can be used; in fiberboard, 0.3 to 1 wt % can be used; in particleboard, 0.2 to 0.75 wt % can be used; and in oriented strandboard, 0.5 to 2 wt % can be used.

The resin and wax formulation may be applied to the lignocellulosic material in any suitable manner, for example, as atomized drops using a sprayer or spinning disk or by a roll coater. After incorporation, the lignocellulosic composites are formed by compression, for example by pressing in single platen presses, multiple platen presses, continuous presses, special presses for molded particle board parts, or calendar installations, optionally with the simultaneous coating of the boards or moldings in a single step, using veneers, resin impregnated paper, foil, metals and textiles, and the like. Other types of pressing equipment or heating equipment such as radio-frequency devices and steam injection presses can be used. Appropriate pressure is applied to the mat to compress to the desired final thickness for a time sufficient to allow the resin to cure and bond the composite. Pressing is generally conducted at high temperature, for example 350 to 450° F.

Oriented strand board (OSB) is one type of composite that can be manufactured using a wax formulation as described herein. To produce OSB using the hot press method, lignocellulosic material is combined with a binder and wax formulation in a mixer. The resulting mixture is flowed onto a support material to make a pre-form, for example a 7/16 inch (about 1.1 centimeters (cm)) to 5/8 inch (about 1.6 cm) thick oriented strand board. The pre-form is then placed on a caul plate in a hot press where the finished good is produced by applying pressures above atmospheric and temperatures greater than room temperature. Pressing times vary as a function of the binder used and the temperature applied, and can be from about 0.08-2 min/mm of board thickness, but are preferably from about 0.12-0.50 min/mm of board thickness. The hot press method is further described in U.S. Pat. No. 4,433,120 to Shui-Tung Chiu. Panels, for example twelve inch by twelve inch (30.5 cm×30.5 cm) panels can be cut from the finished good and tested for density, swell and absorption as described below.

In another embodiment, the wax formulations, generally in the form of an emulsion, are used to impregnate wood material. For example, in one manner of proceeding, impregnating a wood material comprises placing the wood material in a chamber, depressurizing the chamber, adding the emulsion to the chamber in contact with the wood material, and re-pressurizing the chamber.

In still another embodiment, the surface tension/interfacial tension reducing agents can be added to wax formulations, in particular emulsions, used as adjuvants for delivering preservatives to lignocellulosic composite products or into wood in amounts effective to inhibit a biological activity, i.e., biological degradation, such as the growth of molds, fungi, bacteria, insects, etc. Used in this way, the emulsions help the lignocellulosic material retain the preservatives and reduces the amount of preservatives that leach into the environment when the preserved product is placed in use. A wide variety of preservatives are known, including various biocides and combinations comprising one or more preservatives, for example Cyproconazole, tebuconazole, p-cumylphenol (PCP), and its salts such as the sodium salt of p-cumylphenol, petroleum resins, and rosins. The preservative(s) are used in amounts effective to inhibit biological activity in wood or in the lignocellulosic composite product in which it is disposed, e.g., about 0.02 to about 1 wt % of an emulsion, preferably about 0.1 to about 1 wt % of an emulsion. Such amounts generally result in an application rate of about 2 to about 120 grams per cubic foot of wood (g/ft$^3$) (about 70 to about 4240 grams per cubic meter (g/m$^3$)) and about 12 to about 120 g/ft$^3$ (about 425 to about 4240 g/m$^3$). For example, the preservative may be present in an amount that imparts about 0.031 pounds of preservative per cubic foot (about 500 g/m$^3$) of wood.

The invention is further illustrated by the following examples.

Improvements in wax formulation properties can be predicted by measuring the surface tension of compositions containing the wax formulations in accordance with ASTM D-971 and using a dynamic surface tensiometer. Preferred surface tension values for use in lignocellulosic products are about 40 to about 60 dyne/centimeter (dyne/cm) measured at 25° C. Several commercial wax formulations were found to have a surface tension of 72.5 dyne/cm, which is comparable to that of water. Wax formulations comprising 0.025 wt % of a surface tension modifier as described above, on the other hand had a surface tension of 56.6 dyne/cm.

The bar chart in FIG. 1 shows a comparison of the of percent water uptake for binder compositions with and without a surface tension/interfacial tension reducing agent. Samples were made using oriented strand board made from Aspen and Southern yellow pine (SYP); wood fiber (AWF); and particle board made from southern yellow pine (WF) as described above. For each type of sample, a commercial wax formulation containing 58 wt % wax solids and a wax formulation in accordance with the invention and containing 45 wt % wax solids were prepared, and tested for water absorption (WA), thickness (edge) swell (TA), and center swell. The commercial composition (58% solids) has no surface tension/interfacial tension reducing agent, but the inventive composition (45% solids) contains 0.025 wt % of a fluorinated surface tension/interfacial tension reducing agent. As can be seen from the data, use of a surface tension/interfacial tension reducing agent allows lower solids levels to be used, while maintaining or even improving water repellency.

Figure 2:
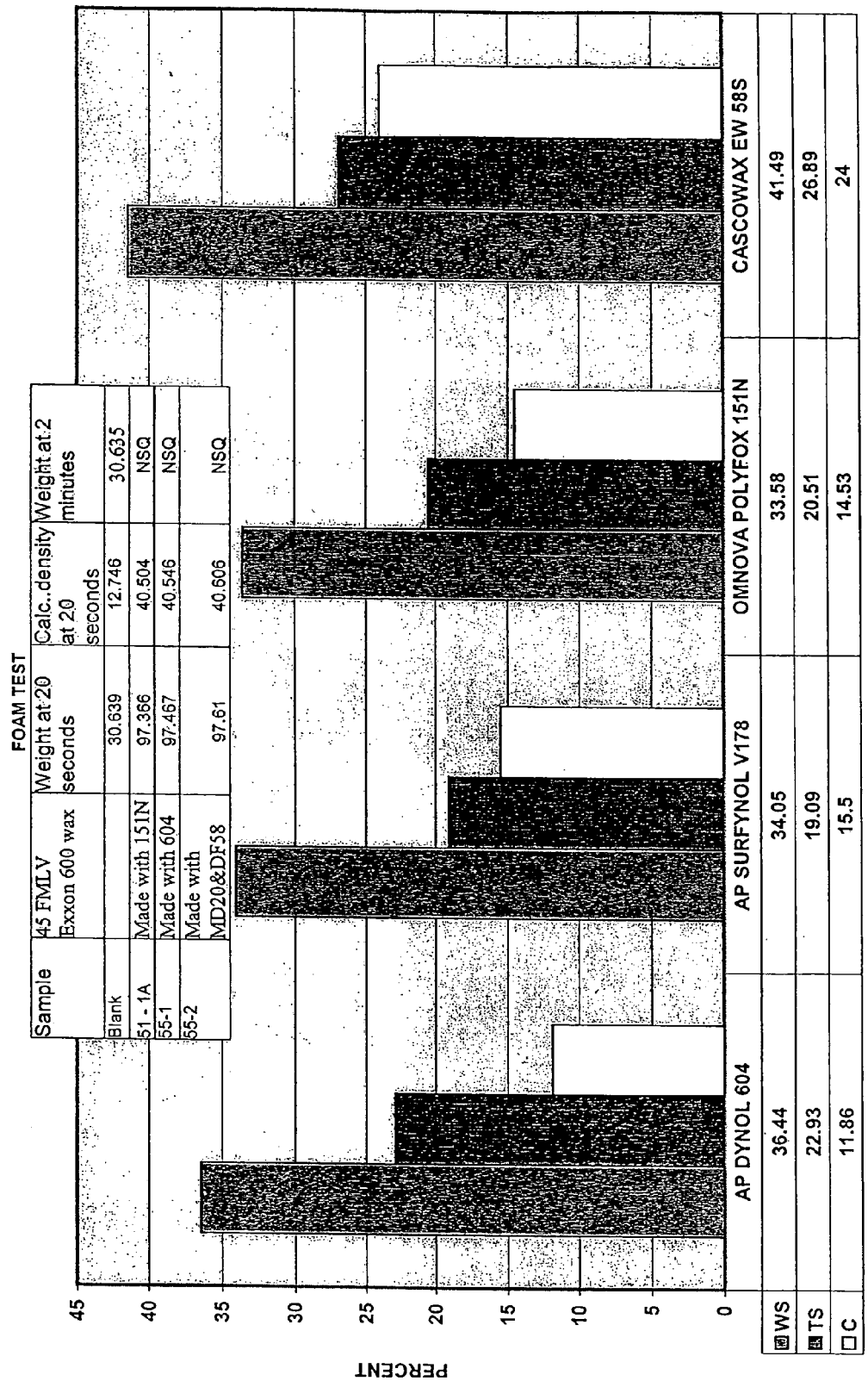
FIG. 2 is a bar graph showing water absorption and foaming results for compositions prepared with the disclosed emulsions in relation to a commercially available control.

FIG. 2 further illustrates that low foaming properties are obtained upon addition of a surface modifying agent to a wax formulation. Here, three different surface tension modifying additives (DYNOL 604, SURFYNOL V178 ("MD20&DF58"), and Omnova's POLYFOX 151N were added to wax formulations and the water absorption and amount of foam measured and compared to a commercially available wax formulation. Improved water repellency characteristics can again be seen. In addition, the formation and persistence of the formed foam was measured at 20 seconds and at two minutes. Any sample having foam after two minutes is considered to fail. The results show that foam remained in the commercially available formulation after two minutes, but not in the inventive examples.

The wax formulations and binder comprising the wax formulations have improved properties, for example improved stability, lower pH, lower foaming, including substantially no foaming, good fluidity, and significant performance improvements in thickness swell and water absorption properties of the final product without degradation of other properties such as bond strength. Thus, the lignocellulosic products produced according to the invention have improved properties, for example, better mechanical properties such as a reduction in swelling in thickness, increased transverse tensile strength, and/or an increase in bending strength.

The surface tension/interfacial tension reducing agents as described above are also useful in other applications, for example with gypsum, cellulosic fiber products such as paper, paper board, corrugated paper board, as well as textile fibers or textile fiber mats (e.g. for ceiling tiles and sound insulation). For cellulosic (paper) products, the wax formulation can be mixed with the fibers, which are then consolidated, or applied to the cellulosic fiber sheets in the form of continuous films or in another continuous form. In another embodiment, it is possible to add the surface modifying agent directly to one of the above-described adhesive resins (e.g., MDI, UF, PUF, MUF, or PF resins) without use of a wax or wax emulsion.

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. Further, the terms "first," "second," and the like herein do not denote any order, quantity, or importance, but rather are used to distinguish one element from another. While certain embodiments and best mode are described herein, these embodiments are merely illustrative. It will be apparent to those skilled in the art that modifications may be made therein without departing from the spirit and the scope of the appended claims.

What is claimed is:

1. A wax emulsion comprising, based on the total weight of the emulsion:
   about 25 to about 80 wt % of water;
   about 20 to about 60 wt % of a wax component;
   about 0.5 to about 5 wt % of an emulsion stabilizing component, wherein the emulsion stabilizing component is derived from a carboxylic acid and an aminoalcohol; and
   a surface tension/interfacial tension reducing agent, wherein the surface tension/interfacial tension reducing agent comprises:
   an alkylphenol alkoxylate, present in an amount of 0.0125 to 0.075 wt %;
   a $C_2$-$C_3$ alkoxylated, substantially symmetrical acetylenic diol having 6 to about 100 carbon atoms, present in an amount of 0.025 to 0.075 wt %; and
   a combination of a $C_2$-$C_3$ alkoxylated, substantially symmetrical acetylenic diol having 6 to about 100 carbon atoms and a siloxane, present in an amount of 0.025 to 0.075 wt %.

2. The emulsion of claim 1, wherein alkoxylated, substantially symmetrical acetylenic diol having 6 to about 100 carbon atoms and a siloxane is present in an amount of 0.03 to 0.05 wt %.

3. The emulsion of claim 1, wherein the carboxylic acid is stearic acid and the aminoalcohol is triethanolamine.

4. A method for making a wax emulsion, comprising:
combining an emulsifiable wax, an aqueous medium, and an emulsion stabilizer to form a mixture;
agitating the mixture to form an emulsion; and then
adding a surface tension/interfacial tension reducing agent after the emulsion is formed, wherein the surface tension/interfacial tension reducing agent comprises an alkylphenol alkoxylate, a $C_2$-$C_3$ alkoxylated, substantially symmetrical acetylenic diol having 6 to about 100 carbon atoms, a combination of a $C_2$-$C_3$ alkoxylated, substantially symmetrical acetylenic diol having 6 to about 100 carbon atoms and a siloxane, wherein the emulsion comprises, based on the total weight of the emulsion:
about 25 to about 80 wt % of water;
about 20 to about 60 wt % of emulsifiable wax;
about 0.5 to about 5 wt % of the emulsion stabilizing component; and
a surface tension/interfacial tension reducing agent, wherein the surface tension/interfacial tension reducing agent comprises:
an alkylphenol alkoxylate, present in an amount of 0.0125 to 0.075 wt %;
a $C_2$-$C_3$ alkoxylated, substantially symmetrical acetylenic diol having 6 to about 100 carbon atoms, present in an amount of 0.025 to 0.075 wt %; and
a combination of a $C_2$-$C_3$ alkoxylated, substantially symmetrical acetylenic diol having 6 to about 100 carbon atoms and a siloxane, present in an amount of 0.025 to 0.075 wt %.

5. The method of claim 4, wherein alkoxylated substantially symmetrical acetylenic diol having 6 to about 100 carbon atoms and a siloxane is present in an amount of 0.03 to 0.05 wt %.

6. The method of claim 4, wherein the emulsion stabilizing component is derived from a carboxylic acid and an aminoalcohol.

7. The method of claim 6, wherein the carboxylic acid is stearic acid and the aminoalcohol is triethanolamine.

8. A lignocellulosic composite, comprising:
a mixture of:
a lignocellulosic material; and
a wax emulsion comprising:
water;
a wax component;
an emulsion stabilizing component, wherein the emulsion stabilizing component is derived from a carboxylic acid and an aminoalcohol; and
a surface tension/interfacial tension reducing agent, wherein the surface tension/interfacial tension reducing agent comprises:
an alkylphenol alkoxylate,
a $C_2$-$C_3$ alkoxylated, substantially symmetrical acetylenic diol having 6 to about 100 carbon atoms, and
a combination of a $C_2$-$C_3$ alkoxylated, substantially symmetrical acetylenic diol having 6 to about 100 carbon atoms and a siloxane.

9. The lignocellulosic composite of claim 8 further comprising a cured adhesive binder.

10. The wax emulsion of claim 1, further comprising a cured adhesive binder.

11. The lignocellulosic composite of claim 8, wherein the wax emulsion comprises, based on the total weight of the emulsion:
about 25 to about 80 wt % of water;
about 20 to about 60 wt % of a wax component;
about 0.5 to about 5 wt % of an emulsion stabilizing component;
0.0125 wt % to 0.075 wt % of an alkylphenol alkoxylate;
0.025 wt % to 0.075 wt % of a $C_2$-$C_3$ alkoxylated, substantially symmetrical acetylenic diol having 6 to about 100 carbon atoms; and
0.025 wt % to 0.075 wt % of a combination of a $C_2$-$C_3$ alkoxylated, substantially symmetrical acetylenic diol having 6 to about 100 carbon atoms and a siloxane.

12. The lignocellulosic composite of claim 11, further comprising a cured adhesive binder.

13. The lignocellulosic composite of claim 8, wherein the lignocellulosic material comprises a material selected from the group consisting of wood fibers, wood flakes, wood strands, wood chips, wood particles, pulp wood, wood wastes, wood bark, saw dust, paper, chips, cellulose-containing fibers of annual plants, granulated biomasses, recycled synthetic rubber, recycled natural rubber, recycled wood fiber, waste fibers, the grinding dust of the boards produced, and mixtures thereof.

14. The lignocellulosic composite of claim 9, wherein the wax emulsion comprises between about 0.1 and about 10 wt % based on the total weight of the wax formulation and cured adhesive binder.

15. A wax emulsion, consisting essentially of:
water;
a wax component;
an emulsion stabilizing component, wherein the emulsion stabilizing component is derived from a carboxylic acid and an aminoalcohol; and
a surface tension/interfacial tension reducing agent, wherein the surface tension/interfacial tension reducing agent comprises:
an alkylphenol alkoxylate;
a first $C_2$-$C_3$ alkoxylated, substantially symmetrical acetylenic diol having 6 to about 100 carbon atoms; and
a combination of a second $C_2$-$C_3$ alkoxylated, substantially symmetrical acetylenic diol having 6 to about 100 carbon atoms and a siloxane.

16. The wax emulsion of claim 15, wherein the wax emulsion comprises:
about 25 to about 80 wt % of water;
about 20 to about 60 wt % of a wax component;
about 0.5 to about 5 wt % of an emulsion stabilizing component;
0.0125 wt % to 0.075 wt % of the alkylphenol alkoxylate;
0.025 wt % to 0.075 wt % of the first $C_2$-$C_3$ alkoxylated, substantially symmetrical acetylenic diol having 6 to about 100 carbon atoms, present in an amount of 0.025 to 0.075 wt %; and
0.025 wt % to 0.075 wt % of the combination of the second $C_2$-$C_3$ alkoxylated, substantially symmetrical acetylenic diol having 6 to about 100 carbon atoms and a siloxane.

17. The wax emulsion of claim 15, wherein the ethoxylated, substantially symmetrical acetylenic diol having 6 to about 100 carbon atoms and a siloxane is present in an amount of 0.03 to 0.05 wt %.

18. The wax emulsion of claim 15, wherein the acid is stearic acid and the aminoalcohol is triethanolamine.

* * * * *